US010502101B2

(12) United States Patent
Urushihata

(10) Patent No.: US 10,502,101 B2
(45) Date of Patent: Dec. 10, 2019

(54) VARIABLE VALVE SYSTEM

(71) Applicant: DENSO CORPORATION, Kariya, Aichi-pref. (JP)

(72) Inventor: Haruyuki Urushihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 15/559,575

(22) PCT Filed: Mar. 11, 2016

(86) PCT No.: PCT/JP2016/001383
§ 371 (c)(1),
(2) Date: Sep. 19, 2017

(87) PCT Pub. No.: WO2016/157757
PCT Pub. Date: Oct. 6, 2016

(65) Prior Publication Data
US 2018/0045088 A1 Feb. 15, 2018

(30) Foreign Application Priority Data

Mar. 27, 2015 (JP) ................... 2015-065676

(51) Int. Cl.
*F01L 13/00* (2006.01)
*F01L 1/352* (2006.01)
(Continued)

(52) U.S. Cl.
CPC ............... *F01L 13/00* (2013.01); *F01L 1/352* (2013.01); *F02D 13/0219* (2013.01);
(Continued)

(58) Field of Classification Search
USPC ............................................ 123/90.17, 90.15
See application file for complete search history.

(56) References Cited

U.S. PATENT DOCUMENTS 4,205,308 A 5/1980 Haley et al.
5,363,817 A * 11/1994 Ikeda ................... F01L 1/34406
123/90.15
(Continued)

FOREIGN PATENT DOCUMENTS

JP 54-68666 6/1979
JP 2002-162252 6/2002
(Continued)

OTHER PUBLICATIONS

International Search Report for PCT/JP2016/001383, dated May 31, 2016, 4 pages.

*Primary Examiner* — Jorge L Leon, Jr.
*Assistant Examiner* — Wesley G Harris
(74) *Attorney, Agent, or Firm* — Nixon & Vanderhye P.C.

(57) ABSTRACT

A variable valve system including a crank angle sensor that measures a rotation angle of a crankshaft, a cam angle sensor that measures a rotation angle of a camshaft coupled to the crankshaft and which opens and closes valves, and a controller that controls the internal combustion engine. At least one of the crank angle sensor or the cam angle sensor is configured as an absolute angle sensor that measures an absolute rotation angle and outputs a voltage signal corresponding to this rotation angle. The controller is configured to perform a correction operation that corrects a rotation angle value calculated based on the voltage signal.

5 Claims, 5 Drawing Sheets

(51) Int. Cl.
  *F02D 41/00* (2006.01)
  *F02D 13/02* (2006.01)
  *G01M 15/06* (2006.01)
  *F02D 41/24* (2006.01)
  *F01L 1/053* (2006.01)
  *F02D 41/28* (2006.01)

(52) U.S. Cl.
  CPC ........... *F02D 41/009* (2013.01); *G01M 15/06* (2013.01); *F01L 1/053* (2013.01); *F01L 2013/111* (2013.01); *F01L 2013/113* (2013.01); *F01L 2250/02* (2013.01); *F01L 2800/14* (2013.01); *F01L 2820/032* (2013.01); *F01L 2820/041* (2013.01); *F01L 2820/042* (2013.01); *F02D 41/2474* (2013.01); *F02D 2041/001* (2013.01); *F02D 2041/281* (2013.01); *F02D 2200/101* (2013.01); *Y02T 10/18* (2013.01)

(56) References Cited

U.S. PATENT DOCUMENTS

| | | | |
|---|---|---|---|
| 2004/0003788 A1* | 1/2004 | Taylor | F01L 1/022 123/90.15 |
| 2005/0211207 A1 | 9/2005 | Urushihata et al. | |
| 2006/0042579 A1* | 3/2006 | Izumi | F01L 1/022 123/90.17 |
| 2006/0260573 A1 | 11/2006 | Urushihata et al. | |
| 2014/0366822 A1* | 12/2014 | Jang | F01L 1/344 123/90.15 |

FOREIGN PATENT DOCUMENTS

| | | |
|---|---|---|
| JP | 2004-156510 | 6/2004 |
| JP | 4329631 | 9/2009 |
| JP | 54-84618 | 5/2014 |
| WO | WO 2016/152066 | 9/2016 |
| WO | WO 2016/152067 | 9/2016 |
| WO | WO 2016/152068 | 9/2016 |

* cited by examiner

VARIABLE VALVE SYSTEM

CROSS REFERENCE TO RELATED APPLICATIONS

This application is in the U.S. national phase of International Application No. PCT/JP2016/001383 filed 11 Mar. 2016, which designated the U.S. and claims priority to Japanese patent application No. 2015-65676 filed on Mar. 27, 2015, the entire contents of each of which are incorporated herein by reference.

The present application is based on Japanese patent application No. 2015-65676 filed on Mar. 27, 2015, the content of which is incorporated herein by reference.

TECHNICAL FIELD

The present disclosure relates to a variable valve system which varies opening and closing timings of a valve in an internal combustion engine.

BACKGROUND ART

Internal combustion engines include intake valve and exhaust valves. The opening and closing of these valves are synchronized with the rotation of a crankshaft of the internal combustion engine and performed at appropriate timings. Specifically, there are configurations in which when the crankshaft rotates, a camshaft coupled to the crankshaft rotates, and a plurality of cams provided on this camshaft open and close respective valves.

Even if the opening and closing timings of the valves, i.e., the crank angles at which the opening and closing of the valves is performed, are always constant, the internal combustion engine may be operated. However, the optimal opening and closing timings of the valves are not always the same, and may change according to operating conditions of the internal combustion engine (such as rotation speed or torque).

For this reason, there have been developments in systems which are able to change the opening and closing timings of valves according to operating conditions, i.e., variable valve systems, and such systems have already been implemented. A variable valve system may change a relationship between the rotation angle of the crankshaft (crank angle) and the rotation angle of the camshaft (cam angle), i.e., a camshaft phase representing a relative rotation angle between the crankshaft and the camshaft. As a result, the opening and closing timings of at least one of the intake valves or the exhaust valves may be changed (for example, see Patent Literature 1).

In a variable valve system, when controlling the opening and closing timings of the valves to be appropriate, it is necessary for the aforementioned camshaft phase to match a target value. For this reason, there is provided a sensor for measuring the crank angle and a sensor for measuring the cam angle. Then, based on the measurement values from these sensors, the camshaft phase at the present time is calculated.

PRIOR ART LITERATURES

Patent Literature

Patent Literature 1: JP 4123127 B

SUMMARY

In the variable valve system described in the above Patent Literature 1, as the sensor for measuring the crank angle, there is provided a sensor which functions by counting a number of pulses generated along with rotation of the crankshaft and measuring the crank angle from this. Further, as the sensor for measuring the cam angle, there is provided a sensor which functions by counting a number of pulses generated along with rotation of the camshaft and measuring the cam angle from this.

These types of sensors do not directly measure the absolute rotation angles of the camshaft etc. (i.e., the absolute value of the camshaft angle etc.), and instead measure an amount of change in the cam angle etc. from a specific state. For this reason, as long as the number of pulses is continuously counted, the absolute value of the cam angle etc. may be measured.

However, in a situation such as directly after a controller is started up, measurement of the absolute value of the cam angle etc. cannot begin without first rotating the crankshaft and the camshaft until reaching a state in which the absolute rotation angle of the camshaft etc. can be determined. Here, "a state in which the absolute rotation angle of the camshaft etc. can be determined" may be, for example, a state where the crank angle sensor detects a tooth gap (a portion where the interval of the generated pulse differs from others) which is formed in advance and corresponds to a particular crank angle (e.g., 0°).

In this regard, in situations such as directly after starting up a controller, the absolute value of the cam angle etc. is unknown for some period of time, and the camshaft phase at the present time cannot be calculated. In this case, there is a concern that the opening and closing timings of the valves cannot be appropriately controlled. For this reason, there is a concern that there may be a wasteful waiting period before a startup control of the internal combustion engine (e.g., an ignition control for adjusting ignition timing) can be started.

It is contemplated that, as a sensor for measuring the cam angle etc., an absolute angle sensor may be used. Such an absolute angle sensor may directly measure the absolute value of the cam angle etc. (without counting pulses). With absolute angle sensors, directly after starting up a controller, the absolute value of the cam angle my be measured at any arbitrary timing and period.

An absolute angle sensor outputs a voltage signal (for example, with a proportional magnitude) according to the rotation angle of the measurement target. When this voltage signal from the absolute angle sensor is input to the controller, the controller calculates the rotation angle of the camshaft etc. based on the voltage signal.

However, the relationship between rotation angle and voltage signal is not always constant, and may change according to, for example, the magnitude of the source voltage input to the absolute angle sensor, the environment of the absolute angle sensor such as atmospheric temperature, and so on. For this reason, there is a concern that the rotation angle calculated based on the voltage signal may deviate from the true value, resulting in a measurement error.

An object of the present disclosure is to provide a variable valve system configured with an absolute angle sensor as at least one of a sensor for measuring cam angle or a sensor for measuring crank angle, the variable valve system being able to suppress measurement errors in this absolute angle sensor.

A variable valve system according to the present disclosure is a variable valve system for varying opening and closing timings of valves in an internal combustion engine, and includes a crank angle measurement unit that measures a rotation angle of a crankshaft in the internal combustion engine, a cam angle measurement unit that measures a rotation angle of a camshaft coupled to the crankshaft, the camshaft configured to open and close the valves, and a controller that controls the internal combustion engine, where at least one of the crank angle measurement unit or the cam angle measurement unit is configured as an absolute angle sensor that measures an absolute rotation angle and outputs a voltage signal corresponding to this rotation angle, and the controller is configured to perform a correction operation that corrects a rotation angle value calculated based on the voltage signal.

According to the variable valve system configured in this manner, at least one among the crank angle measurement unit which measures the rotation angle of the crankshaft and the cam angle measurement unit which measure the rotation angle of the camshaft is configured as an absolute angle sensor that measures an absolute rotation angle (of the crankshaft etc.). For this reason, this configuration is able to measure the absolute rotation angle of the crankshaft etc. at any arbitrary timing.

The controller performs the correction operation that corrects the rotation angle value calculated based on the voltage signal. Such a correction operation, for example, is performed by calculating the rotation angle based on the value of a corrected voltage signal, or by correcting the rotation angle value calculated based on the value (measured value) of the voltage signal. Further, the correction operation may change the calculation method itself.

By performing the correction operation based on various factors (such as ambient temperature) which may affect the measurement accuracy of the absolute angle sensor, it is possible to suppress the occurrence of measurement errors by the absolute angle sensor.

According to the present disclosure, there is provided a variable valve system in which at least one among a sensor for measuring cam angle and a sensor for measuring crank angle is configured as an absolute angle sensor, and this variable valve system may suppress the occurrence of measurement errors from this absolute angle sensor.

DESCRIPTION OF EMBODIMENTS

Figure 1:
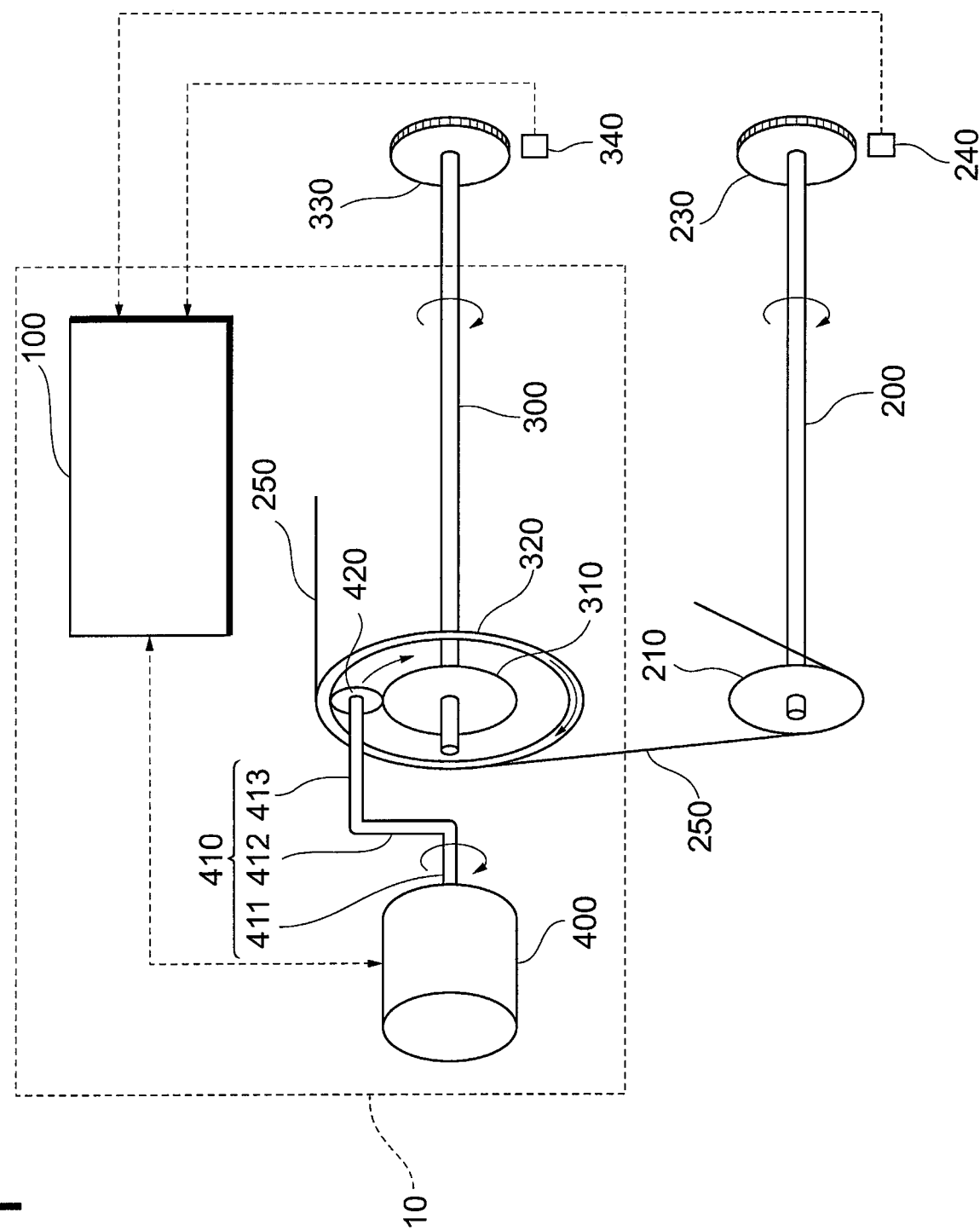
FIG. 1 is a schematic view showing the configuration of a variable valve system according to an embodiment of the present disclosure.

Hereinafter, embodiments of the present disclosure will be described with reference to the attached drawings. For ease of understanding, the same component elements in each drawing will be denoted with the same reference numerals where possible, and overlapping descriptions will be omitted.

A variable valve system 10 according to an embodiment of the present disclosure is mounted on a vehicle including an internal combustion engine, which is not illustrated. The variable valve system 10 varies the opening and closing timings of intake valves in this internal combustion engine. Further, this configuration is exemplary, and the variable valve system 10 may vary the opening and closing timings of exhaust valves instead. Further alternatively, the variable valve system 10 may separately vary the opening and closing timings of both intake valves and exhaust valves.

The configuration of the above described vehicle will be explained with reference to FIG. 1. Here, FIG. 1 shows portions of the vehicle for explaining the configuration and operation of the variable valve system 10 as will be described below. The vehicle includes a crankshaft 200 which is rotated by the driving power of the internal combustion engine, and a camshaft 300 which rotates by being coupled to the crankshaft 200.

A pulley 210 and a detection target body 230 are provided on the crankshaft 200. The pulley 210 is a substantially circular board shaped rotating body. The crankshaft 200 perpendicularly passes through the center of the primary surfaces of the pulley 210. The pulley 210 is fixed with respect to the crankshaft 200, and as the crankshaft 200 rotates, the pulley 210 also rotates as a result.

A timing chain 250 is provided on an outer circumferential surface of the pulley 210. The rotation of the pulley 210, i.e., the rotation of the crankshaft 200, is transmitted through the timing chain 250 to the variable valve system 10 (an outer gear 320 as will be described later), and is transmitted through the variable valve system 10 to the camshaft 300.

The detection target body 230 is a substantially circular board shaped rotating body. The crankshaft 200 perpendicularly passes through the center of the primary surfaces of the detection target body 230. The detection target body 230 is fixed with respect to the crankshaft 200, and as the crankshaft 200 rotates, the detection target body 230 also rotates as a result.

The detection target body 230 is provided for a crank angle sensor 240, which is part of the variable valve system 10, to detect a rotation angle of the crankshaft 200 (hereinafter, also referred to as a "crank angle"). A plurality of protrusions are formed at equal intervals along the outer circumference of the detection target body 230. However, the intervals of the protrusions are not all equal, and at just one place, the interval is different from the others.

The crank angle sensor 240 is disposed so as to face the outer circumferential surface of the detection target body 230. When the crankshaft 200 and the detection target body 230 rotate, the detection target body 230 causes a voltage pulse to be generated each time a protrusion of the detection target body 230 passes nearby. These pulses are signals representing measurement values of the crank angle, and are input to a controller 100. The controller 100 counts these pulses to measure the crank angle. In other words, the crank angle sensor 240 corresponds to a crank angle measurement unit.

When the portion of the detection target body 230 at which the interval between protrusions is different than others (hereinafter, also referred to as a "tooth gap part") passes by the crank angle sensor 240, in other words, when it is detected that the constant pulse interval has changed, the controller 100 recognizes that the crank angle is at a specific value (for example, 0°). In this regard, the tooth gap part formed on the outer circumference of the detection target body 230 functions to allow the controller 100 to recognize (or determine) the absolute value of the crank angle.

The camshaft 300 is a shaft provided with cams (not illustrated) for opening and closing intake valves. The camshaft 300 is coupled with the rotation of the crankshaft 200 to rotate, and as a result, the cams move to open and close the intake valves.

An inner gear 310, which is a part of the variable valve system 10, is provided on the camshaft 300 along with a detection target body 330. The inner gear 310 is a substantially circular board shaped rotating body. The camshaft 300 perpendicularly passes through the center of the primary surfaces of the inner gear 310. The inner gear 310 is fixed with respect to the camshaft 300, and as the inner gear 310 rotates, the camshaft 300 also rotates as a result. As will be explained in detail later, the variable valve system 10 is configured such that the rotation of the crankshaft 200 is transmitted through the inner gear 310 to the camshaft 300, and due to this, the camshaft 300 is rotated.

The detection target body 330 is a substantially circular board shaped (though not perfectly circular) rotating body. The camshaft 300 perpendicularly passes through the center of the primary surfaces of the detection target body 330. The detection target body 330 is fixed with respect to the camshaft 300, and as the camshaft 300 rotates, the detection target body 330 also rotates as a result.

The detection target body 330 is provided for a cam angle sensor 340, which is a part of the variable valve system 10, to detect a rotation angle of the camshaft 300 (hereinafter, also referred to as a "cam angle").

The cam angle sensor 340 is disposed so as to face the outer circumferential surface of the detection target body 330. The primary surfaces of the detection target body 330 are not perfect circles. For this reason, as the camshaft 300 and the detection target body 330 rotate, the gap between the cam angle sensor 340 and the outer circumferential surface of the detection target body 330 gradually changes along with the rotation.

The shape of the detection target body 330 is configured such that a relationship between the rotation angle value of the camshaft 300 (0° to 360°) and the aforementioned gap is one to one. Further, the cam angle sensor 340 is configured as a so-called gap sensor, and outputs a voltage signal corresponding to the size of the aforementioned gap. In other words, the cam angle sensor 340 is a sensor capable of measuring the absolute value of the cam angle (an absolute angle sensor), and corresponds to a cam angle measurement unit. The aforementioned voltage signal is a signal representing the measured value (absolute value) of the cam angle, and is input to the controller 100.

As described above, when the crankshaft 200 of the internal combustion engine rotates, this rotation is transmitted through the timing chain 250 and the variable valve system 10 to the camshaft 300, and due to this the camshaft 300 rotates. In the vehicle with this configuration, the opening and closing timings of the intake valves, i.e., the crank angles at which the intake valves are opened and closed, are determined by the relative rotation angle of the camshaft 300 (hereinafter, referred to as "camshaft phase") with respect to the crankshaft 200. The variable valve system 10 varies the camshaft phase to vary the opening and closing timings of the intake valves.

As schematically shown in FIG. 1, the variable valve system 10 includes the inner gear 310, an outer gear 320, a planet gear 420, a motor 400, a support shaft 410, and the controller 100.

The inner gear 310 is fixed to the camshaft 300 as already described, and integrally rotates together with the camshaft 300. Teeth (not illustrated) formed on the outer circumferential surface of the inner gear 310 are meshed with the planet gear 420, which is described later.

The outer gear 320 is a ring shaped member forming a part of a sprocket (not illustrated) that rotates synchronously with the crankshaft 200. The outer gear 320 is positioned such that the center axis of the outer gear 320 coincides with the center axis of the camshaft 300. The timing chain 250 is placed on the outer circumferential surface of the outer gear 320 (the sprocket). For this reason, when the crankshaft 200 and the pulley 210 rotate, this rotation is transmitted through the timing chain 250 to the outer gear 320, and due to this the outer gear 320 rotates. Teeth (not illustrated) formed on the inner circumferential surface of the outer gear 320 are meshed with the planet gear 420.

The planet gear 420 is a circular gear positioned so as to be meshed with both the outer teeth of the inner gear 310 and the inner teeth of the outer gear 320. Due to the motor 400 and the support shaft 410 which will be described later, the planet gear 420 is able to revolve along the outer circumferential surface of the inner gear 310 so as to trace a circular orbit.

The motor 400 is a rotating electric machine that operates when supplied with electric power. The motor 400 causes the planet gear 420 to revolve along the outer circumferential surface of the inner gear 310. The rotation speed of the motor 400 is controlled by the controller 100. Further, the motor 400 outputs a pulsed voltage signal (rotation angle signal) to the controller 100 each time the rotation angle of its rotation shaft (output shaft) changes by a predetermined amount (e.g., 10°). This rotation angle signal is generated by a Hall sensor (not illustrated) equipped in the motor 400.

The support shaft 410 is connected to the motor 400 and the planet gear 420. The support shaft 410 includes a rotation portion 411, a coupling portion 412, and a support portion 413.

The rotation portion 411 is a portion which is integral with the rotation shaft of the motor 400. The rotation portion 411 is positioned such that the center axis of the rotation portion 411 coincides with the center axis of the camshaft 300. The coupling portion 412 is formed so as to extend from an end portion of the rotation portion 411 (the end portion away from the motor 400) perpendicularly with respect to the center axis of the rotation portion 411. The support portion 413 is formed so as to extend from an end portion of the coupling portion 412 (the end portion away from the rotation portion 411) in parallel with respect to the center axis of the rotation portion 411. An end portion of the support portion 413 (the end portion away from the coupling portion 412) is connected to the planet gear 420. The planet gear 420 is attached to the end portion of the support portion 413 so as to be freely rotatable about the center axis of the support portion 413.

As already explained, the controller 100 controls the rotation speed of the motor 400. When the rotation speed of the motor 400, i.e., the revolution speed of the planet gear 420 is the same as the rotation speed of the outer gear 320 (the sprocket), the rotation speed of the inner gear 310 and the camshaft 300 are equal to the rotation speed of the outer gear 320. In this state, the camshaft phase value is constant, and so the opening and closing timings of the intake valves also remain constant.

However, when the rotation speed of the motor 400 changes, and the revolution speed of the planet gear 420 is different from the rotation speed of the outer gear 320, the camshaft phase changes. As a result, the opening and closing timings of the intake valves also changes.

Then, when the rotation speed of the motor 400 returns to being equal to the rotation speed of the outer gear 320, the camshaft phase returns to being constant (though at a different value than prior to the rotation speed of the motor 400 changing), and the opening and closing timings of the intake valves also return to being constant. In this regard, by momentarily changing the rotation speed of the motor 400 to be different from rotation speed of the outer gear 320, the camshaft phase may be changed, and as a result the opening and closing timings of the intake valves may be varied.

The controller 100 controls the overall operation of the variable valve system 10, and also controls the operation of the internal combustion engine. The controller 100 is configured as a computer system including a CPU, RAM, ROM, interfaces, etc.

The controller 100 controls the rotation speed of the motor 400 so that the camshaft phase matches a target value. Specifically, the controller 100 calculates the crank angle based on the pulses input from the crank angle sensor 240, and calculates the cam angle based on the voltage signal input from the cam angle sensor 340. Then, the controller 100 calculates the camshaft phase at the present time based on a difference between the crank angle and the cam angle. The controller 100 feeds back the calculated camshaft phase while controlling the rotation speed of the motor 400 such that this camshaft phases matches a target value.

Further, in addition to the above described process of controlling the cam angle phase to match a target value (camshaft phase control), the controller 100 also controls the internal combustion engine. Specifically, the controller 100 performs an injection control that regulates fuel injection (fuel injection timing, fuel injection amount, etc.) in the internal combustion engine. Further, the controller 100 also performs an ignition control that regulates ignition (ignition timing, ignition energy, etc.) in the internal combustion engine.

Figure 2:
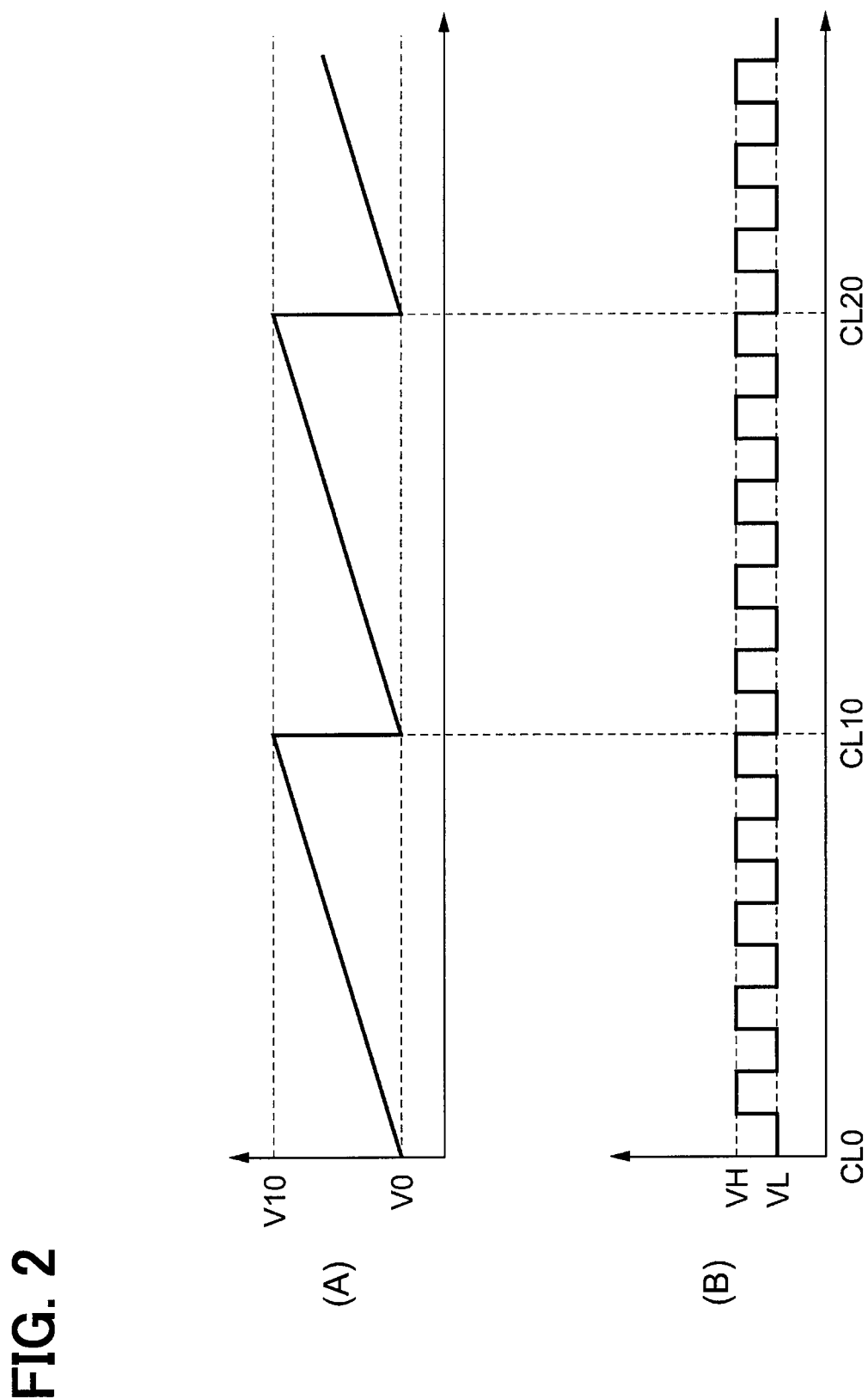
FIG. 2 is a time chart showing various signals input to a controller.

FIG. 2 is a time chart showing various signals input to the controller 100 when controlling the internal combustion engine, i.e., when both the crankshaft 200 and the camshaft 300 are rotating. In FIG. 2, (A) shows the voltage signal input from the cam angle sensor 340 to the controller 100. In FIG. 2, (B) shows the rotation angle signal input from the motor 400 to the controller 100.

During one rotation of the camshaft 300, in other words, during the transition of the cam angle from angle CL0 to angle CL1, as shown in FIG. 2(A), the voltage signal (voltage value) from the cam angle sensor 340 changes substantially linearly from valve V0 to value V10. A corresponding relationship between the value of the voltage value and the cam angle is stored in advance in the controller 100. Based on this corresponding relationship, the controller 100 converts the inputted voltage signal into the cam angle. The cam angle is calculated in this manner.

While both the crankshaft 200 and the camshaft 300 are rotating, as previously mentioned, the rotation shaft of the motor 400 is also rotating. For this reason, as shown in FIG. 2(B), a pulse shaped rotation angle signal is input to the controller 100. The rotation angle signal is a rectangular wave signal where the low side voltage is a value VL, and the high side voltage is a value VH. Further, in FIG. 2(B), the frequency of the rotation angle signal generated as the cam angle changes from angle CL0 to angle CL10 is illustrated as lower than the real frequency.

Figure 3:
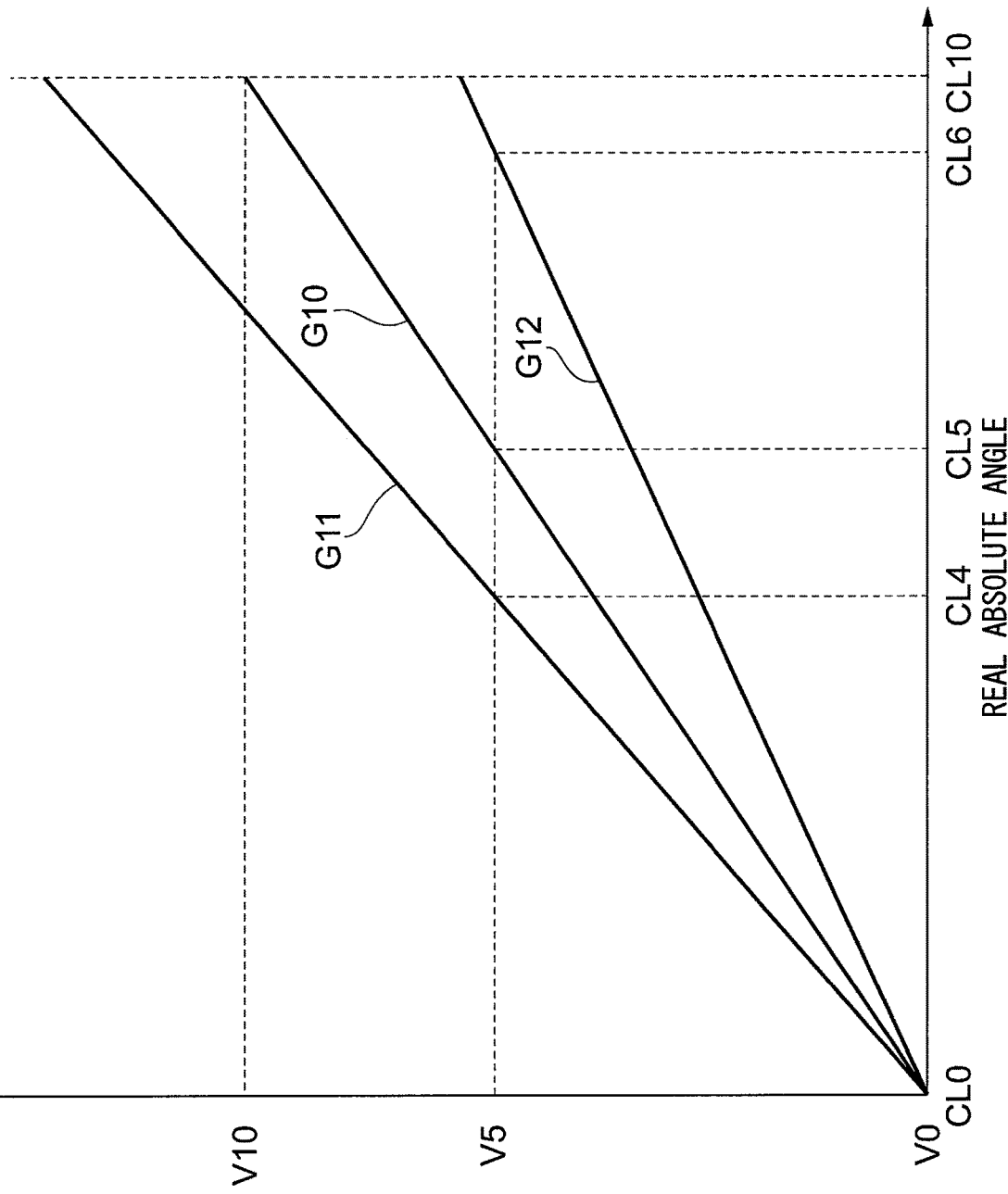
FIG. 3 is a graph showing a relationship between rotation angle and sensor voltage.

The corresponding relationship between the voltage signal from the cam angle sensor 340 and the cam angle will be explained with reference to FIG. 3. The vertical axis of the graph shown in FIG. 3 is the voltage value of the voltage signal input from the cam angle sensor 340 to the controller 100 (hereinafter, also referred to as "sensor voltage"). The horizontal axis of the graph is the real value of the absolute cam angle.

A line G10 in FIG. 3 is a graph showing the corresponding relationship between the value of the voltage signal and the cam angle. As previously mentioned, as the sensor voltage changes, the cam angle changes substantially linearly. In the example shown by line G10 in FIG. 3, when the cam angle is angle CL0, the sensor voltage is value V0. Further, when the cam angle is angle CL10, the sensor voltage is value V10. In addition, when the cam angle is angle CLS, the sensor voltage is value V5. In other words, when the sensor voltage is V5, the controller calculates angle CL5 as the crank angle.

It should be noted that the corresponding relationship (line G10) between the value of the voltage signal from the cam angle sensor 340 and the cam angle is not always the same, and tends to change due to a variety of factors. For example, if the source voltage input to the cam angle sensor 340 exceeds a rated value, the corresponding relationship between the value of the voltage signal and the cam angle tends to exceed line G10, such as shown by line G11 in FIG. 3.

In this case, when the sensor voltage is V5, the real cam angle is angle CL4 (which is smaller than angle CL5). However, if the line G10 is used, then the cam angle will be calculated as angle CL5.

Further, if the source voltage input to the cam angle sensor 340 falls below a rated value, the corresponding relationship between the value of the voltage signal and the cam angle tends to become smaller than line G10, such as shown by line G12 in FIG. 3.

In this case, when the sensor voltage is V5, the real cam angle is angle CL6 (which is larger than angle CL5). However, if the line G10 is used, then the cam angle will be calculated as angle CL5.

In this regard, there is a concern that the calculated cam angle may not match the real cam angle, resulting in measurement errors. Here, in the variable valve system 10 according to the present embodiment, a plurality of corresponding relationships (such as lines G10, G11, G12 of FIG. 3) are stored in advance in case the source voltage changes. The controller 100 is configured to select an appropriate corresponding relationship in accordance with the value of the source voltage at the present time, and perform the cam angle calculation based on the selected corresponding relationship. For this reason, it is possible to suppress measurement errors resulting from changes in the value of the source voltage.

Further, measurement errors from factors other than changes in the value of the source voltage may also be suppressed in the same manner as described above. For example, when the rotation speed of the internal combustion engine becomes high, the corresponding relationship between the value of the voltage signal from the cam angle sensor 340 and the cam angle tends to change from the line G10 to the line G12. For this reason, the controller 100 may select an appropriate corresponding relationship in accordance to the rotation speed of the internal combustion engine, and perform the cam angle calculation based on the selected corresponding relationship.

When the temperature of the cam angle sensor 340 becomes low, the corresponding relationship between the value of the voltage signal from the cam angle sensor 340 and the cam angle tends to change from the line G10 to the line G11. Further, when the temperature of the cam angle sensor 340 becomes high, the corresponding relationship between the value of the voltage signal from the cam angle sensor 340 and the cam angle tends to change from the line G10 to the line G12. For this reason, the controller 100 may select an appropriate corresponding relationship in accordance to a sensor temperature (such as the temperature of the cam angel sensor 340) or a sensor mounting portion temperature (such as the temperature of the location at which the cam angel sensor 340 is mounted), and perform the cam angle calculation based on the selected corresponding relationship.

Figure 4:
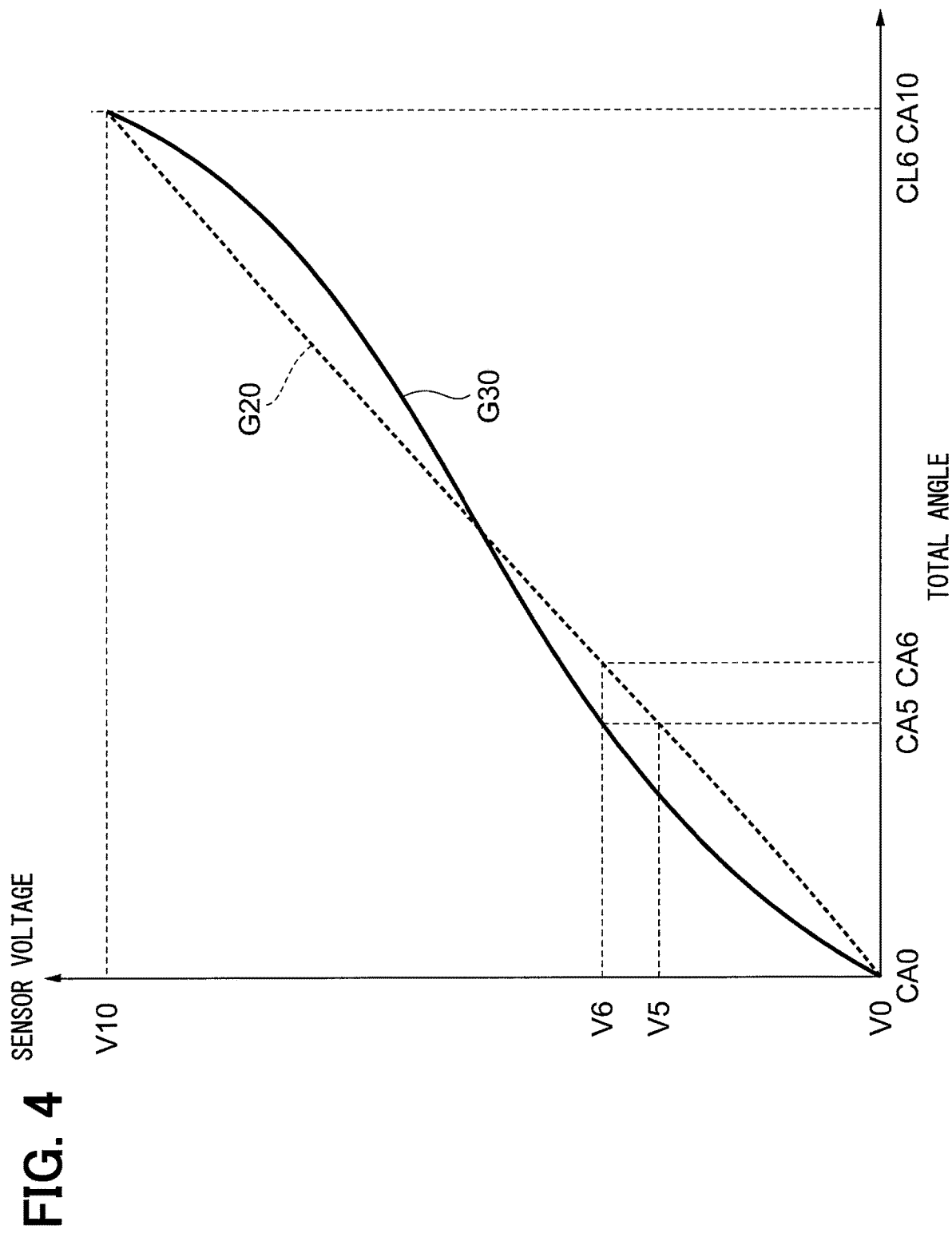
FIG. 4 is a graph showing a relationship between total angle and sensor voltage.

A method of correcting the linearity of the voltage signal output form the cam angle sensor 340 will be described. The vertical axis of the graph shown in FIG. 4 is the voltage value of the voltage signal input from the cam angle sensor 340 to the controller 100 (sensor voltage). The horizontal axis of the graph is total angle.

The total angle is calculated based on the count value of pulses of the rotation angle signal from the motor 400, and is an amount of change in the cam angle. Specifically, total angle is a value obtained by multiplying the count value of pulses with the amount of change in cam angle for one pulse of the rotation angle signal.

Further, while the cam angle phase remains constant, the rotation shaft of the motor 400 and the camshaft 300 rotate at the same rotation speed. For this reason, the size of "cam angle for one pulse of the rotation angle signal" is constant. Conversely, while the cam angle phase is varying (transition period), the rotation shaft of the motor 400 and the camshaft 300 rotate at different rotation speeds. For this reason, "cam angle for one pulse of the rotation angle signal" also changes along with this. The total angle on the horizontal axis of FIG. 4 is calculated while considering this change.

As mentioned above, the total angle shows changes in the rotation angle of the camshaft 300. For this reason, the corresponding relationship between the value of the voltage signal and the total angle is similar to the line G10 of FIG. 3. One example of the corresponding relationship between the value of the voltage signal and the total angle is shown by line G20 in FIG. 4. In the example shown by line G20, the sensor voltage is value V0 when the total angle is angle CA0, and the sensor voltage is value V10 when the total angle is angle CA10.

Change in the sensor voltage as the cam angle (total angle) changes is normally linear as shown by line G10 (line G20). However, due to individual differences in the cam angle sensor 340 or surrounding environment, it may become curved such as shown by line G30. When linearity is lost in this manner, there is a possibility that measurement errors may occur in the cam angle.

Accordingly, the controller 100 corrects the sensor voltage based on the value of the total angle. As one example, an explanation will be provided for when change in the sensor voltage according to change in cam angle (total angle) is as shown by the line G30.

The controller 100 counts the pulses of the rotation angle signal from the when the sensor voltage is at value V0, and calculates the total angle based on this.

Next, when the sensor voltage from the cam angle sensor 340 is at value V6, if the cam angle is calculated under the assumption that the voltage signal is linear, the calculated cam angle will correspond to the total angle at angle CA6.

However, the controller 100 is calculating the total angle as described above, and recognizes that the total angle at the present time is angle CA5. Accordingly, the controller 100 calculates the cam angle as an angle corresponding to the total angle at angle CA5. Due to this, even if the linearity of the sensor voltage is lost, it is possible to suppress measurement errors as a result of this.

Further, when the total angle at the present time is angle CA5, the corresponding sensor voltage in line G20 is value V5. Here, the controller 100 calculates a correction value as the difference between value V6 and value V5, and by performing a correction operation so as to subtract this correction value from the sensor voltage, the controller 100 may calculate the cam angle based on the (corrected) sensor voltage.

A malfunction determination may be performed for the cam angle sensor 340 based on the total angle. One example of such a malfunction determination will be explained with reference to FIG. 5.

Figure 5:
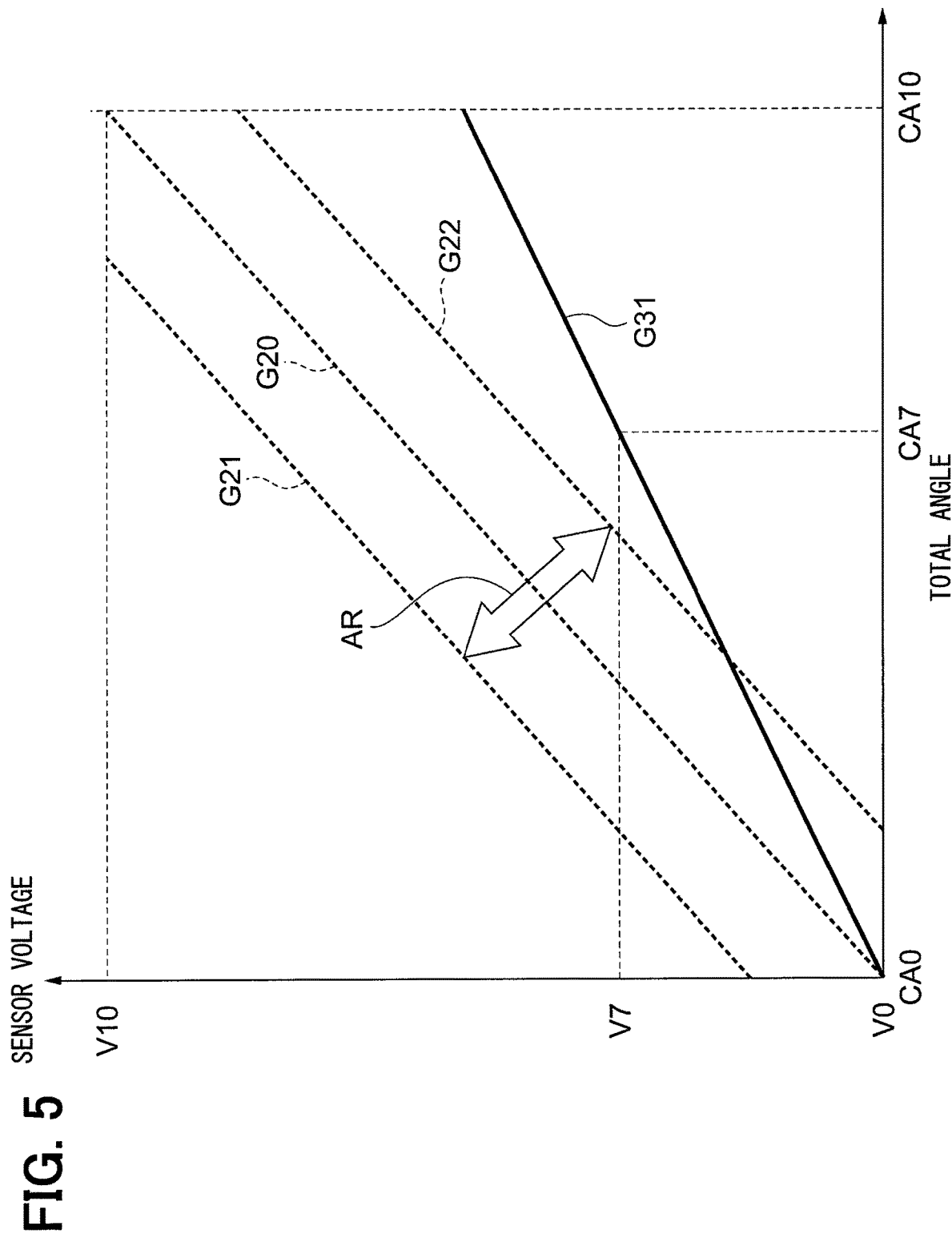
FIG. 5 is a graph showing a relationship between total angle and sensor voltage.

FIG. 5 is a graph similar to FIG. 4. The vertical axis of the graph in FIG. 5 is sensor voltage, and the horizontal axis is total angle. The line G20 of FIG. 5 is the same as the line G20 in FIG. 4. In other words, the line G20 shows the relationship between total angle and sensor voltage when the sensor voltage is behaving linearly.

The line G21 in FIG. 5 is equal to the line G20 when parallel displaced upward by a fixed amount. The line G22 in FIG. 5 is equal to the line G20 when parallel displaced downward by a fixed amount. A region AR between line G21 and line G22 is a region of values obtained from the sensor voltage during normal operation of the cam angle sensor 340.

When the cam angle sensor 340 is not mounted properly, or when the signal line form the cam angle sensor 340 is damaged, etc., even if the camshaft 300 is rotating (i.e., even if the total angle is increasing), the sensor voltage does not increase normally. At this time, as shown by line G31 in FIG. 5, when the total angle is at angle CA7, the measured sensor voltage is at value V7, which is outside of the region AR.

When the controller 100 detects that the sensor voltage value is outside of the region AR, the controller 100 determines that a malfunction has occurred in the cam angle sensor 340, and reports this to the driver of the vehicle. At the same time, necessary controls for evacuation running of the vehicle are started.

Further, the above described malfunction determination may be performed while the internal combustion engine is stopped (when the crankshaft 200 is not rotating) and the variable valve system 10 causes only the camshaft 300 to rotate.

In the above explanation, when the cam angle sensor 340 is an absolute angle sensor, methods of correcting the measurement value of the absolute angle sensor, and methods of determination malfunctions are described. The embodiments of the present disclosure are not limited to these examples. For example, the crank angle sensor 240 may be configured as an absolute angle sensor in the same manner as the cam angle sensor 340, and in the same manner as described above, the measurement value of the crank angle sensor 240 may be corrected, and malfunction determinations may be performed for the crank angle sensor 240.

Above, a plurality of embodiments of the present disclosure are described with reference to specific examples. However, the present disclosure is not limited to these specific examples. In other words, these specific examples may be appropriately modified by a skilled person without changing the gist of the present disclosure as long as the features of the present disclosure are included. The present disclosure is not limited to the various elements described with respect to the specific examples, not the placement, material, conditions, shapes, or sizes thereof, any of which may be appropriately modified. Further, the various components included in each of the aforementioned embodiments may be combined where possible on a technical basis, and these combinations are included in the scope of the present disclosure as long as the gist of the present disclosure is maintained.

The invention claimed is:

1. A variable valve system for varying opening and closing timings of valves in an internal combustion engine, comprising:
   a crank angle measurement unit that measures a rotation angle of a crankshaft in the internal combustion engine;
   a cam angle measurement unit that measures a rotation angle of a camshaft coupled to the crankshaft, the camshaft configured to open and close the valves; and
   a controller that controls the internal combustion engine, wherein
   at least one of the crank angle measurement unit or the cam angle measurement unit is configured as an absolute angle sensor that measures an absolute rotation angle and outputs a voltage signal corresponding to the absolute rotation angle,
   the controller is configured to perform a correction operation that corrects a rotation angle value calculated based on the voltage signal,
   the variable valve system further comprises a rotating electric machine for varying a camshaft phase, the camshaft phase being a relative rotation angle of the camshaft with respect to the crankshaft,
   the rotating electric machine includes an output shaft and is configured to:
   regulate a rotation speed of the output shaft to match the camshaft phase to a target value, and
   output a pulse shaped rotation angle signal each time a rotation angle of the output shaft changes by a predetermined amount, and
   the controller performs the correction operation further based on the pulse shaped rotation angle signal.

2. The variable valve system of claim 1, wherein
   the controller performs the correction operation further based on a source voltage input from the absolute angle sensor.

3. The variable valve system of claim 1, wherein
   the controller performs the correction operation further based on a rotation speed of the internal combustion engine.

4. The variable valve system of claim 1, wherein
   the controller performs the correction operation further based on a sensor temperature or a sensor mounting portion temperature of the absolute angle sensor.

5. The variable valve system of claim 1, wherein
   the controller is configured to determine whether a malfunction has occurred in the absolute angle sensor based on the pulse shaped rotation angle signal.

* * * * *